Sept. 17, 1940.  L. LOEWY  2,214,734
HYDRAULIC METAL EXTRUSION PRESS
Filed Nov. 18, 1938
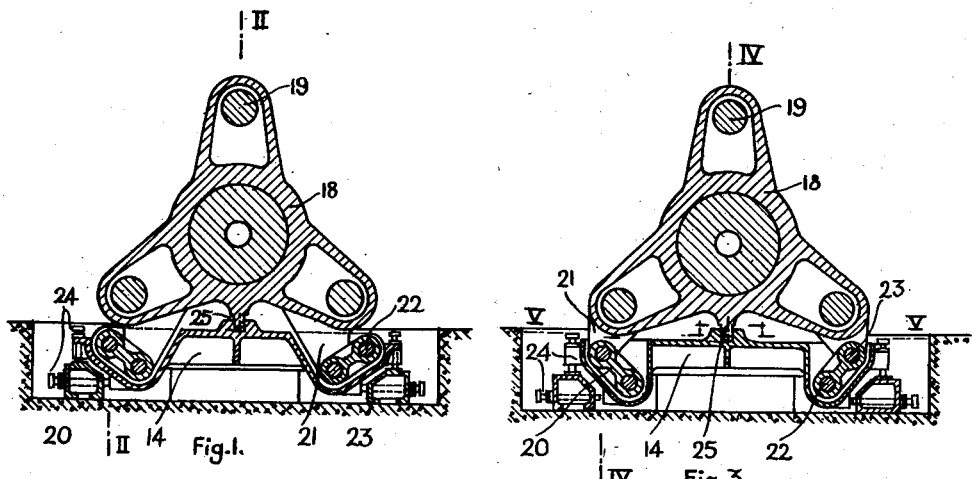
Fig. 1.  Fig. 3.
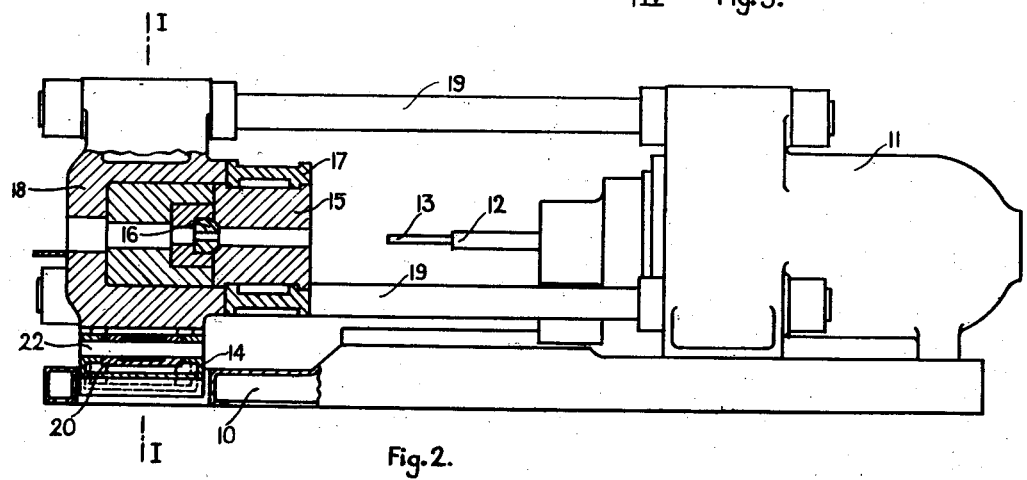
Fig. 2.
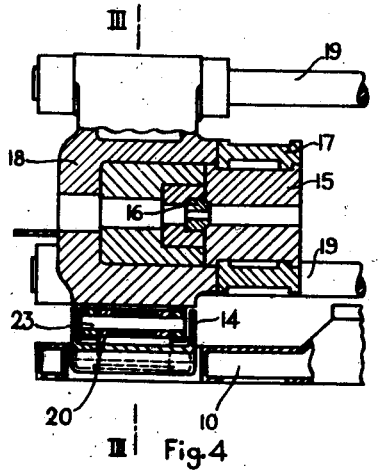
Fig. 4.
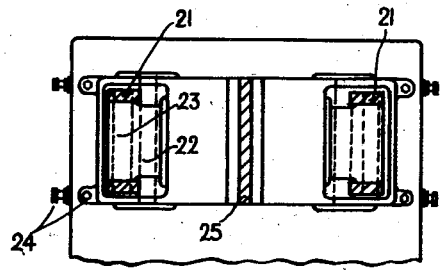
Fig. 5.  Inventor
Ludwig Loewy Patented Sept. 17, 1940

2,214,734

UNITED STATES PATENT OFFICE 2,214,734

HYDRAULIC METAL EXTRUSION PRESS

Ludwig Loewy, London, England

Application November 18, 1938, Serial No. 241,181

2 Claims. (Cl. 207—3)

The present invention relates to hydraulic metal extrusion presses, and more particularly to an extrusion press of the horizontal type. When working these presses, heated billets are placed in a part of the press known as the container, and are then pressed out through a shaping die arranged at the end of the container. This operation is effected by means of a hydraulically operated press ram and, in the case of the manufacture of tubes, a mandrel is also used.

The heat developed in the container by the billets and by a special heating system which, with a more modern type of extrusion press is usually provided around the container, causes expansion of the parts which are located in the neighbourhood of the container, such as its holder and the platen carrying this holder. Unless specific means are provided for supporting the container or the platen, which means allow for free expansion of these parts, the axial alignment of the container and the die in relation to other parts of the press, such as the ram and the mandrel, is liable to be upset. If these parts were not kept in axial alignment, the products obtained by the extrusion operation would be faulty; and in particular the wall thickness of extruded tubes would not be uniform.

It is, therefore, an object of my invention to provide a hydraulic metal extrusion press of the horizontal type, in which the parts subjected to heat are supported in such a way that they can freely expand in all directions.

It is a further object of my invention to provide a press of the above-mentioned type, in which the axial alignment of the heated parts in relation to other parts is ensured during the working of the press.

A further object of my invention is to provide a press of the above-mentioned type, in which there is no sliding movement between the supporting members of the heated parts and the supported parts themselves during expansion of the latter.

A further object of my invention is to provide a press of the above-mentioned type, in which the supporting members of the heated parts are so arranged that they do not obstruct access to the container.

In the press according to the invention, that part of the press which is affected by the heat developed in and near the container is supported by means of pivoted links on a part of the press frame which is not affected by this heat, these links extending in a direction perpendicular to that in which the points where the links are attached to the supported part will expand. As this expansion takes place in the planes through the axis of the press and the points of pivoted attachment respectively, the links will extend in a direction substantially perpendicular to these planes. When the press is working, those ends of the links which are attached to the frame part will not be displaced by heat expansion, whereas the ends of the links attached to the heated part which is supported by them will be displaced and thereby cause the links to swing on their pivots on the frame part, which pivots will remain stationary. In view, however, of the above-described arrangement of the links, there will be no bodily movement of the supported part, and the axial alignment of the container and the die will be maintained under all working conditions.

The part of the press frame to which the links are attached is preferably adjustable in relation to the frame of the press, so as to be able to preset the axial position of the supported part and thereby also that of the container and the die before commencing operation of the press.

It is one of the specific features of the invention that the supporting members can be arranged entirely or almost entirely below the level of the press, so that they do not obstruct access to the press.

In the accompanying drawing is shown two embodiments of the invention for the purposes of illustration.

Fig. 1 is a section in a vertical plane along the line 1—1 of Fig. 2.

Fig. 2 is a side elevation, partly in section, of one embodiment of a press according to the invention.

Fig. 3 is a section in a vertical plane along the line 3—3 of Fig. 4.

Fig. 4 is a side elevation, partly in section, and

Fig. 5 is a section in a horizontal plane along the line 5—5 of Fig. 4 of a second embodiment of a press according to the invention.

In the press according to Figs. 1 and 2, 10 designates the bedplate or frame of a horizontal metal extrusion press, on which the hydraulic cylinder 11 is mounted. 12 is the ram and 13 the mandrel of the press. On the base-plate 10, a framelike carrier block 14 is mounted, the purpose of which is described below. The container 15 of the press is arranged opposite the hydraulic cylinder, so that the container bore is co-axial with the press. A die 16 is inserted in the bore of the container at its rear end. The container 15 is lodged in a holder 17, so as to be easily removable therefrom. The holder is fixed to a platen 18, connected with the hydraulic cylinder by means of tie-rods 19.

So far, the press is of a known design and no claim is made for any of the details described above.

According to the invention, two links 20 are used for supporting the heated parts of the press, such as the platen 18. The links are attached to the carrier block 14 and to lugs 21, extending from the platen 18, by means of pins 22 and 23 respectively, and are so located in relation to the container that they are substantially perpendicular to the direction of expansion of the platen at the pins 23. Any expansion of the platen will only result in a slight rotation of the links 20 around their pivots 22, but not in a bodily movement of the platen and the parts carried by it. The latter will, therefore, always remain in axial alignment with the other parts of the press, once it has been correctly set. To accomplish this setting, horizontal and vertical screws 24 are provided between the carrier block 14 and the base-plate 10.

In order to prevent any lateral displacement of the platen in relation to the vertical central plane, a key 25 is fixed to the bottom of the platen 18 and projects into a groove of the carrier block 14.

In the embodiment according to Figs. 1 and 2, the links 20 are so arranged that the upper ends are connected with the carrier block 14 and the lower ends with the platen 18; thus the links form a kind of suspension system. In the embodiment according to Figs. 3 and 5, the arrangement is reversed, as there the upper ends of the links are connected with the platen 18 and the lower ends with the carrier block 14, so that the platen is supported from underneath. In all other respects, the two embodiments are similar, and therefore the same reference numbers have been used for both embodiments.

In the two embodiments shown and described above, the link mechanism according to the invention is applied for supporting the platen of the press, which in its turn carries the container holder with the container and the die. It is to be understood, however, that the invention can also be used for directly supporting the container holder, the platen being supported in this instance either by another system of links or by other suitable means. This modification is of particular importance in regard to presses in which the container is axially moveable, e. g., presses working by the indirect process. At this type of press is well known in the art, no further description or illustration of the modification is thought necessary.

I claim as my invention:

1. In an extrusion press of the type referred to, a frame, a container for hot billets, a member carrying the said container, a member mounted on the said frame and means for supporting the said container carrying-member on the said frame-member, the said means comprising pivoted links extending in directions substantially perpendicular to planes through the axis of the press and the points of pivotal attachment of the said links to the said container carrying-member.

2. In an extrusion press of the type referred to, a frame, a container for hot billets, a member carrying the said container, a member mounted on the said frame, means for supporting the said container carrying-member on the said frame-member, the said means comprising pivoted links extending in directions substantially perpendicular to planes through the axis of the press and the points of pivotal attachment of the said links to the said container carrying-member and means for adjusting the said frame-member in relation to the axis of the press.

LUDWIG LOEWY.